(12) United States Patent
Vangeel et al.

(10) Patent No.: US 9,869,758 B2
(45) Date of Patent: Jan. 16, 2018

(54) MITIGATING DISTURBANCE IN SENSING (71) Applicant: KONINKLIJKE PHILIPS N.V., Eindhoven (NL)

(72) Inventors: Jurgen Mario Vangeel, Beerse (BE); Roger Peter Anna Delnoij, Lommel (BE); Johannes Jozef Wilhelmus Kalfs, Eindhoven (NL); Michel Albertus Theodorus Klein Swormink, Eindhoven (NL); Petrus Antonius Verbeek, Deurne (NL); Johannes Martinus Maria Hensing, Veldhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/888,782

(22) PCT Filed: Apr. 18, 2014

(86) PCT No.: PCT/EP2014/057993
§ 371 (c)(1),
(2) Date: Nov. 3, 2015

(87) PCT Pub. No.: WO2014/177404
PCT Pub. Date: Nov. 6, 2014

(65) Prior Publication Data
US 2016/0077197 A1    Mar. 17, 2016

(30) Foreign Application Priority Data
May 3, 2013  (EP) ..................... 13166359

(51) Int. Cl.
*G01S 7/527*     (2006.01)
*G01S 15/04*     (2006.01)
(Continued)

(52) U.S. Cl.
CPC .......... *G01S 7/527* (2013.01); *G01S 7/52001* (2013.01); *G01S 15/04* (2013.01); *H05B 37/0227* (2013.01)

(58) Field of Classification Search
CPC . G01S 7/527; G01S 15/04; G01S 7/52; H05B 37/02
See application file for complete search history.

(56) References Cited

U.S. PATENT DOCUMENTS 3,828,336 A    8/1974  Massa
5,453,932 A    9/1995  Brabec
(Continued)

FOREIGN PATENT DOCUMENTS

JP    10009846        1/1998
JP    2008249671 A   10/2008
(Continued)

*Primary Examiner* — Daniel Pihulic (57) ABSTRACT

A signal processing module for use with a receiver for receiving echoes of an emitted signal. The signal processing module comprises sensing logic for sensing presence of a being or object in a space using echoes of the signal as reflected from the being or object, wherein the echoes are received with an associated frequency band. The signal processing module further comprises control logic for detecting disturbance having potential to compromise said sensing, wherein the signal processing module is configured to detect this disturbance by listening for an unwanted signal in a region of the spectrum outside the frequency band of the echoes, and to adapt the sensing in dependence on the detected disturbance.

15 Claims, 4 Drawing Sheets

(51) Int. Cl.
G01S 7/52 (2006.01)
H05B 37/02 (2006.01)

(56) References Cited

U.S. PATENT DOCUMENTS

| | | |
|---|---|---|
| 2009/0195166 A1 | 8/2009 | Chen |
| 2010/0067324 A1 | 3/2010 | Preissler |
| 2012/0147705 A1 | 6/2012 | Hick |
| 2012/0232890 A1 | 9/2012 | Suzuki et al. |
| 2016/0077197 A1* | 3/2016 | Vangeel .............. G01S 7/52001 315/297 |

FOREIGN PATENT DOCUMENTS

| | | | | |
|---|---|---|---|---|
| JP | 2009098098 A | 5/2009 | | |
| JP | 2011047779 A | 3/2011 | | |
| NL | WO 2014177404 A1 * | 11/2014 | ......... | G01S 7/52001 |
| WO | WO2003065324 A1 | 8/2003 | | |
| WO | 2004104623 A1 | 12/2004 | | |
| WO | 2009036825 A1 | 3/2009 | | |
| WO | 2011151772 A1 | 12/2011 | | |

* cited by examiner

MITIGATING DISTURBANCE IN SENSING

CROSS-REFERENCE TO PRIOR APPLICATIONS

This application is the U.S. National Phase application under 35 U.S.C. § 371 of International Application No. PCT/EP2014/057993, filed on Apr. 18, 2014, which claims the benefit of European Patent Application No. 13166359.3, filed on May 3, 2013. These applications are hereby incorporated by reference herein.

TECHNICAL FIELD

The present disclosure relates to the sensing of a being or other object. For example the sensing may be used to control one or more lighting devices in dependence on a detected occupancy within a room, corridor, or other indoor or outdoor space; or for other sensing applications.

BACKGROUND

In current lighting applications, energy efficiency is a more and more important subject.

One possible way to reduce the energy consumption of a lighting system is to switch off or dim the lights when no persons are present, and conversely to switch on the lights when someone is present. In order to do this, the presence of any people in the relevant space has to be detected (e.g. to detect whether there is anyone present in a certain room or area of a room). The presence of a person in a space may be described as occupancy. Different types of occupancy sensors or presence sensors are currently in use. Most of these sensors are motion sensors and use a passive infrared (PIR) sensor to detect motion.

Another way of detecting the presence of a person is to use an active sensing technique whereby one or more waves are emitted into the space in question and presence is detected based on echoes received back. One technology suitable for use in active sensing is ultrasound (US). An active ultrasound presence detector sends out a signal in the form of a series of bursts of acoustic waves (or a continuous wave) at an ultrasonic frequency, e.g. 40 kHz. The sensor then uses the echoes it receives back from the environment to determine whether there is presence in that environment, e.g. in a room. Different methods can be used for this, for example Doppler shift measurements, time-of-flight measurements, and/or moving target indicator (MTI) processing.

When performing active measurements in an environment, the measurement may be compromised by another signal source in the same space that emits a signal with similar characteristics as the presence detector. For example it has been shown that when a keychain or set of keys is rattled, it emits sound including a component in the ultrasound spectrum and this can lead to a false positive when performing a measurement at the same time. As another example, the sensor in question may experience interference from another nearby ultrasound sensor transmitting at the same or even a different moment in time, depending on such factors as output sound pressure level, time between bursts from the two sensors, and distances between the two sensors.

Such false positives could lead to lights being turned on when no occupant is present. Alternatively if the sensitivity of the sensor is decreased to try to avoid this, then small but genuine motions of a person may be missed. Interference or other disturbance may also be an issue in other sensing applications.

SUMMARY

A difficulty with detecting interference or other disturbance is distinguishing between the wanted signal and the disturbance. For instance an active sensor cannot conventionally detect interference during its own measurement period (the time slot during which it listens for an echo of its own signal), as it cannot distinguish between its own signal and an interfering signal.

The present invention on the other hand turns to the frequency domain to look for disturbance outside the band of the wanted signal. This may be done during the measurement period of the wanted signal, in regions of the spectrum either side of the wanted signal's expected band. If disturbance is found there, it may be inferred that disturbance is likely to extend into that band as well. Alternatively or additionally, the detection may be performed outside wanted signal's measurement period, across a wide band including but extending beyond that of the wanted signal. This may be relevant to finding disturbance which may extend into the measurement period of the sensor.

Hence according to one aspect disclosed herein, there is provided a signal processing module for use with a receiver for receiving echoes of an emitted signal. The signal processing module comprises sensing logic for sensing presence of a being or object in a space using echoes of the signal as reflected from the being or object, wherein the echoes are received with an associated frequency band. The signal processing module further comprises control logic for detecting disturbance having potential to compromise said sensing. The control logic is configured to detect this disturbance by listening for an unwanted signal in a region of the spectrum outside the frequency band of the echoes, and to adapt the sensing in dependence on the detected disturbance.

In embodiments, to reduce false positives, the control logic may be configured to determine whether there is interference both (i) for the full (relevant) spectrum prior to a measurement period, and (ii) outside of the expected spectrum of an echo from an active pulse during the measurement period.

The amplitude of the detected signal may then be used to determine by what amount a signal detection threshold is to be modified (increased) in order to reduce the sensitivity of the sensing, and thereby reduce false triggers while still being able to detect presence.

When for a number of consecutive measurements it is determined that interference is present, this may be an indication that another ultrasound presence detection device is performing measurements too. In this case the control logic may decide to determine a new timeslot for performing its measurements such that these can be performed without continued interference. In this case if the detection threshold was previously increased because of interference, it may be reduced again so that the increase need only have been temporary and the sensitivity can be restored.

In an example application there is provided a lighting system comprising: the signal processing module, the receiver arranged to receive the echoes of the emitted signal, a transmitter arranged to emit said signal, and one or more lighting devices. In this case the control logic is configured to control the one or more lighting devices in dependence on the sensing.

According to a further aspect, there may be provided a computer program product for performing sensing based on echoes of an emitted signal. The computer program product comprises code embodied on a computer-readable medium and being configured so as when executed on a processor to perform operations on accordance with any of the sensor features disclosure herein.

BRIEF DESCRIPTION OF THE DRAWINGS

For a better understanding of the present disclosure and to show how embodiments may be put into effect, reference is made to the accompanying drawings in which.

DETAILED DESCRIPTION OF PREFERRED EMBODIMENTS

Figure 1:
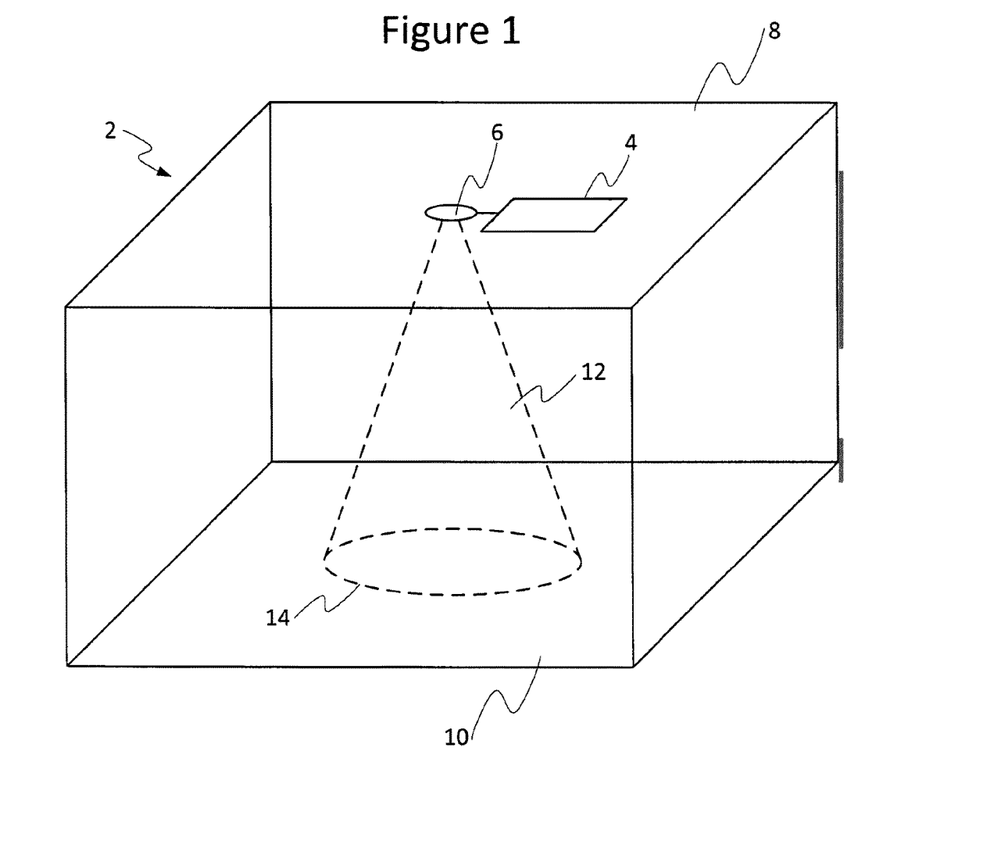
FIG. 1 is a schematic illustration of a sensing region within a space.

FIG. 1 illustrates an example of an environment in which embodiments disclosed herein may be employed.

The environment comprises an indoor or outdoor space 2 such as an office space, an interior space within a home, a laboratory, a marquee, garden or park, etc. The space 2 comprises a sensor 6 mounted or otherwise disposed at a location enabling it to sense a being in the space 2 or a desired region 12 within the space. In the illustrative example, the sensor 6 is mounted on the ceiling 8 of the office 2 so as to sense presence of someone walking on the floor 10. In this case the sensing region 12 may correspond to a certain area 14 on the floor 10.

Figure 3:
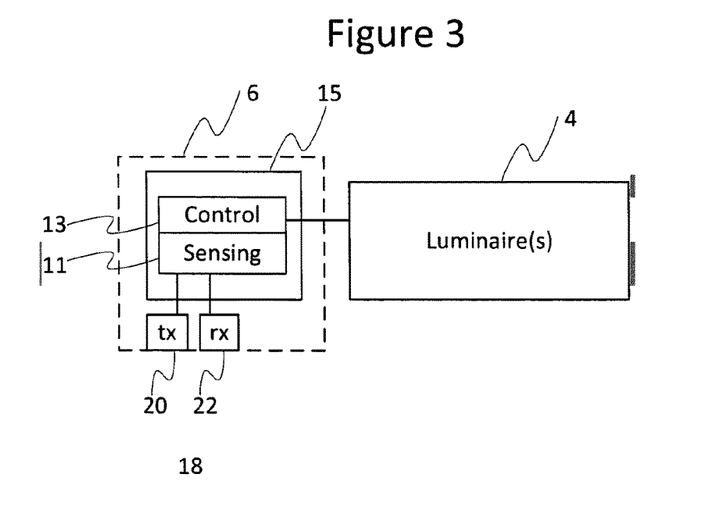
FIG. 3 is a schematic block diagram of a lighting device with sensor.

As shown schematically in FIG. 3, the sensor 6 comprises a signal processing module 15, and an ultrasound transceiver 18 comprising an ultrasound transmitter 20 and an ultrasound receiver 22 coupled to the signal processing module 15. The signal processing module 15 may be implemented in code (software) stored on a memory comprising one or more storage media, and arranged for execution on a processor comprising on or more processing units. The code is configured so as when fetched from the memory and executed on the processor to perform operations in line with embodiments discussed below. Alternatively it is not excluded that some or all of the signal processing module 15 is implemented in dedicated hardware circuitry, or configurable hardware circuitry like an FPGA.

In an example application of the teachings disclosed herein, the space 2 comprises one or more lighting devices 4 in the form of one or more luminaires operable to emit light. The signal processing module 15 of the sensor 6 is coupled to the luminaire(s) 4 for controlling the light to be turned on or off, or dimmed, in dependence on presence being sensed. The luminaire(s) 4 may be arranged to be controlled directly by the sensing results output by the signal processing module 15, or by the signal processing module 15 reporting sensing results to a separate control unit, e.g. a central controller responsible for controlling a plurality of luminaires.

In embodiments the signal processing module 15, transmitter 20 and receiver 22 are integrated together into the same unit (e.g. same housing) to form a self-contained sensor unit. For example the signal processing module 15 may take the form of code stored on an embedded memory of the sensor 6 and arranged for execution on an embedded processor of the sensor 6. Further, in some embodiments the sensor 6 may be integrated together into the same unit (same housing) as a luminaire 4, to form a self-contained, autonomously controlled lighting unit.

Figure 4:
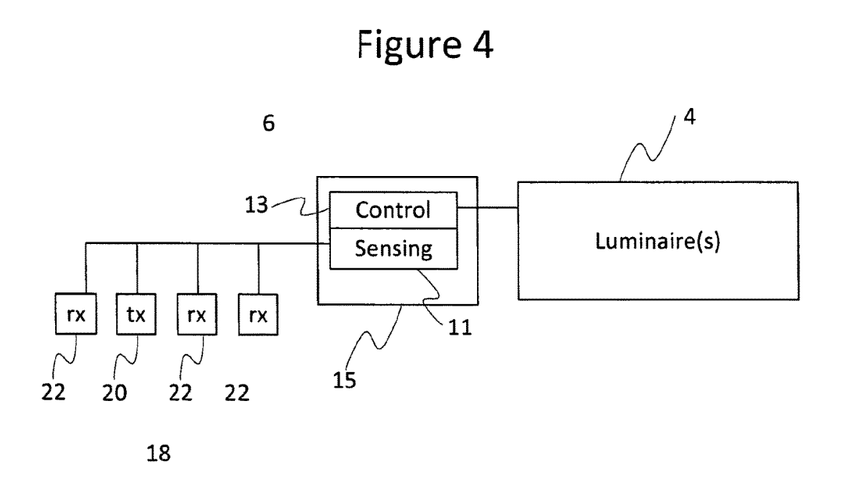
FIG. 4 is a schematic block diagram of a lighting device with distributed sensor system, FIG. 5 schematically illustrates times and frequencies for detecting disturbance.

In alternative arrangements as illustrated in FIG. 4, the transceiver 18 need not be self-contained and/or need not comprise the same number of transmitters 20 as receivers 22. Instead there may be provided a plurality of receivers 22 distributed about the space 2 and served by a common transmitter 20. Alternatively or additionally, the signal processing module 15 (or some elements of it) could be remote from the transmitter 20 and/or receiver(s) 22, e.g. as part of a central controller processing signals from multiple receivers. In general any combination of integrated or distributed components is possible.

The transmitter 20 is arranged to emit an ultrasound signal. In embodiments the signal is emitted in the form of a series of pulses of a certain frequency (e.g. 40 kHz), but it could also be a continuous wave identifiable by its frequency (e.g. again 40 kHz). The transceiver 18 also comprises a receiver 22 for receiving back echoes of the transmitted signal, e.g. of the transmitted pulses. Presence can be sensed based on detection of the pulses (or more generally signal) being echoed (reflected) from a being or other object in the relevant space 2, e.g. by detecting motion based on a Doppler shift between the transmitted signal and received echo. Techniques for sensing of presence based on reflected echoes will in themselves be familiar to a person skilled in the art.

Figure 2:
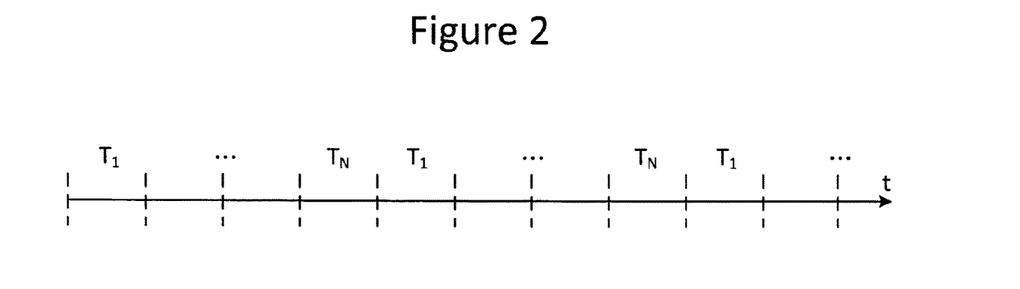
FIG. 2 schematically illustrates a series of timeslots.

FIG. 2 illustrates a scheme for emitting pulses and detecting echoes of those pulses in order to perform sensing. Here, the sensor 6 is arranged to operate according to a time slot based scheme, whereby the sensor 6 is allocated a certain time slot $T_1$ of the scheme, in which it performs its sensing. The time slot $T_1$ occurs at repeated instances over time, e.g. regularly in time. In embodiments there is also a space between the successive instances of a given time slot $T_1$, e.g. the instances of the time slot $T_1$ occurring at regular intervals. For example, the scheme may comprise a sequence of multiple exclusive, successive time slots $T_1 \ldots T_N$ and the sensor 6 may be one of multiple sensors operating in the same environment, with each being configured to use a different respective one of the time slots $T_1 \ldots T_N$. In this case the sequence repeats over time, with each sensor using an instance of its respective time slot in each repeated instance of the cycle.

The time slots may be allocated by a central controller or at a commissioning stage. Alternatively in embodiments, each individual sensor or at least at the sensor 6 allocates its own time slot autonomously. In the self-allocated case, the signal processing module 15 is configured to select a time slot for itself and the switch to a different time slot if it detects interference in the current time slot from another sensor within listening range.

The signal processing module 15 of the sensor 6 comprises sensing logic 11 and control logic 13. The sensing logic 11 is arranged to process the incoming signals arriving at the receiver 22 in order to detect whether a being appears to be in the space 2. For example this may be done based on motion if motion is detected it is assumed this is due to a living thing, most likely person in a typical application. The sensing logic 11 thus generates a signal whose magnitude represents the output of the receiver 22, which is indicative of presence, e.g. representative of a size or speed of motion sensed. The magnitude of the signal may be represented for example in terms of amplitude or power (amplitude squared).

The transmitter 20 emits a pulse at the beginning of one instance of its time slot $T_1$ and listens for any echo occurring in the rest of that instance of the time slot $T_1$. This is the measurement period. If the magnitude of the signal received at the receiver 22 exceeds a detection threshold, the sensing logic 11 determines this to be a positive sensing result indicative that a being is found in the space 2 (of course the sensing logic 11 cannot necessarily know that the thing being sensed is alive, but it is assumed the property being sensed, e.g. motion, is likely to be due to a living being). Beyond the end of the instance of the respective time slot $T_1$ on the other hand, the sensing logic 11 does not consider received signals to be indicative of presence and need not process those signals, e.g. because it is now the time $T_2$ . . . $T_N$ in which pulses from other sensors will be emitted, and/or because that would represent a time-of-flight and therefore distance from the sensor that is beyond the range of interest.

The control logic 13 is arranged to control the one or more luminaires 4 to be switched on and off, and/or dimmed, in dependence on whether a positive sensing result is determined to occur given the incoming signals arriving at receiver 22 in instances of the respective time slot $T_1$. The control logic 13 is also configured to mitigate an effect of disturbance in the sensed signal, as will be exemplified below.

When using sensors such as pulse-based ultrasound presence sensors, presence (e.g. motions) that are detected result in a signal of a certain amplitude. For example the amplitude of this signal can be related to the size or speed of the movement. A person walking (and therefore making larger movements) will give a larger signal than a person typing behind a computer. No presence results in a much lower amplitude signal.

However, the received signal will also comprises a certain amount of disturbance. The term disturbance is used herein to refer to any of random or meaningless noise, and/or any interference from another transmitting source such as another active sensor in the same environment, or to any other unwanted disturbances (other than the wanted signal) that are not necessarily readily categorized as either completely random or due to another information-carrying signal. For example the jangling of a set of keys can create high frequency tones which interfere with an ultrasound sensor. In another example the noise level will also be impacted by disturbances in the environment (i.e. airflow): more airflow will give an increased noise level. E.g. this could result from air conditioning.

In order to at least mitigate an effect of disturbance occurring in the environment 2, the control logic 13 is configured to detect disturbance and to adapt the sensing in dependence on the result. The detection then comprises an out-of-band measurement which listens outside the expected band of the wanted signal. To do this, the control logic 13 is configured to generate a frequency domain representation of the signal received via the receiver 22 (e.g. applying a transform for transforming from the time domain such as a fast Fourier transform or discrete cosine transform). Embodiments are now discussed in relation to FIGS. 5 and 6.

Figure 5:
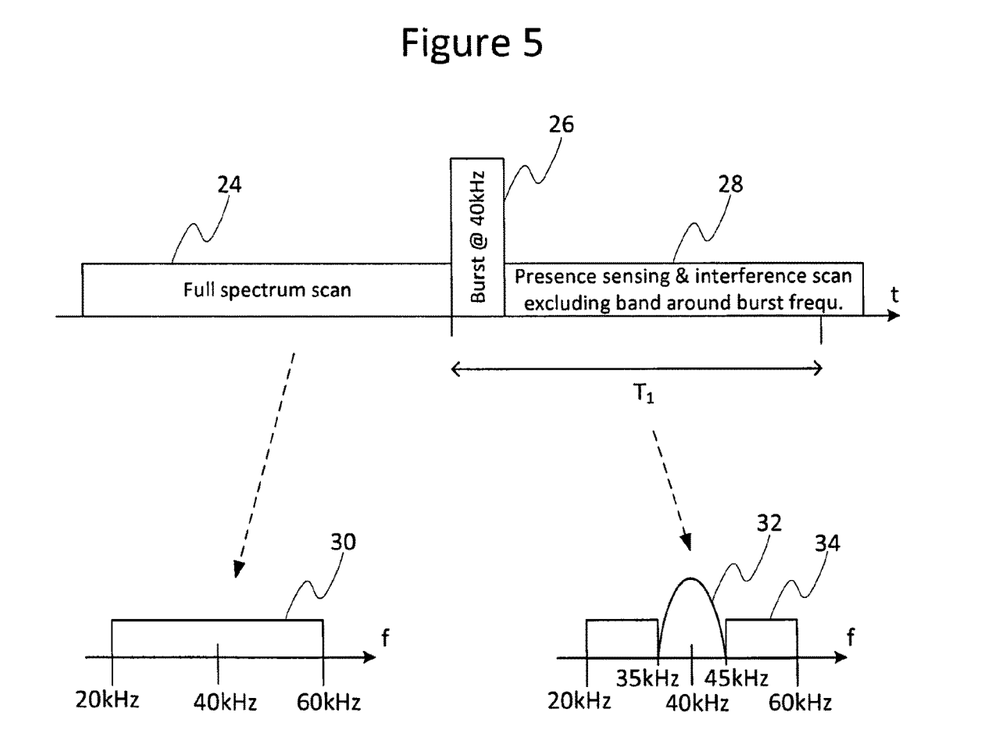

Referring to FIG. 5, the out-of-band measurement may take the form of a "wide-band" measurement 24 across a frequency range 30 including the expected band of the echoed pulses (i.e. of the wanted signal) but also extending beyond that band. This measurement may be performed outside the measurement period of the sensor 6, i.e. outside the currently apportioned timeslot $T_1$.

Alternatively or additionally, the out-of band measurement may take the form of a "side-band" measurement 28 excluding the expected band 32 of the wanted signal, and performed only in side regions 34 flanking that band. This measurement may be performed inside the measurement period of the sensor 6, i.e. so within the currently apportioned timeslot $T_1$.

When listening inside the expected band and outside of the sensor's timeslot, any signal that is received is treated as being unwanted (because it can be known the sensor 6 itself is not causing it).

During the sensor's own timeslot, if no presence occurs and there is no interference from another sensor or the like, then the measurement of the received signal will just consist of noise. In case of a moving object or person, the signal will increase beyond this minimum signal level threshold and presence will be reported.

However when listening inside the band of the sensor's own timeslot, there is no way to distinguish between the echo of the sensor's own emitted signal and a signal from an interfering source. This has the potential to inhibit the operation of the presence sensor 6 as an interfering source may lead to an increased detection threshold, meaning that even wanted signals may now fail to exceed the threshold.

The relation between the signal level outside the band and the signal level inside the band need not necessarily be quantified analytically. But it can be considered that, when the signal level is high outside the band, there is substantial likelihood that the signal level inside the band will also be increased. It is possible, albeit less likely, that there is only a narrow disturbance outside the band, but it may be better to be safe than sorry. Therefore in embodiments, the sensor's detection threshold is increased in response to detecting out-of band inference. When dealing with normal movement, the sensor 6 would only see an increase of the signal level inside the band, not outside.

In embodiments, the detection threshold is increased only temporarily. If the disturbance measurement subsequently detects repeated interference in or around the same time slot as the sensor 6, it may be assumed this results from another regularly transmitting source such as another active sensor operating in or near the same time slot. In response, the sensor 6 then moves to a different time slot and lowers the detection threshold again (i.e. restores the sensitivity).

Figure 6:
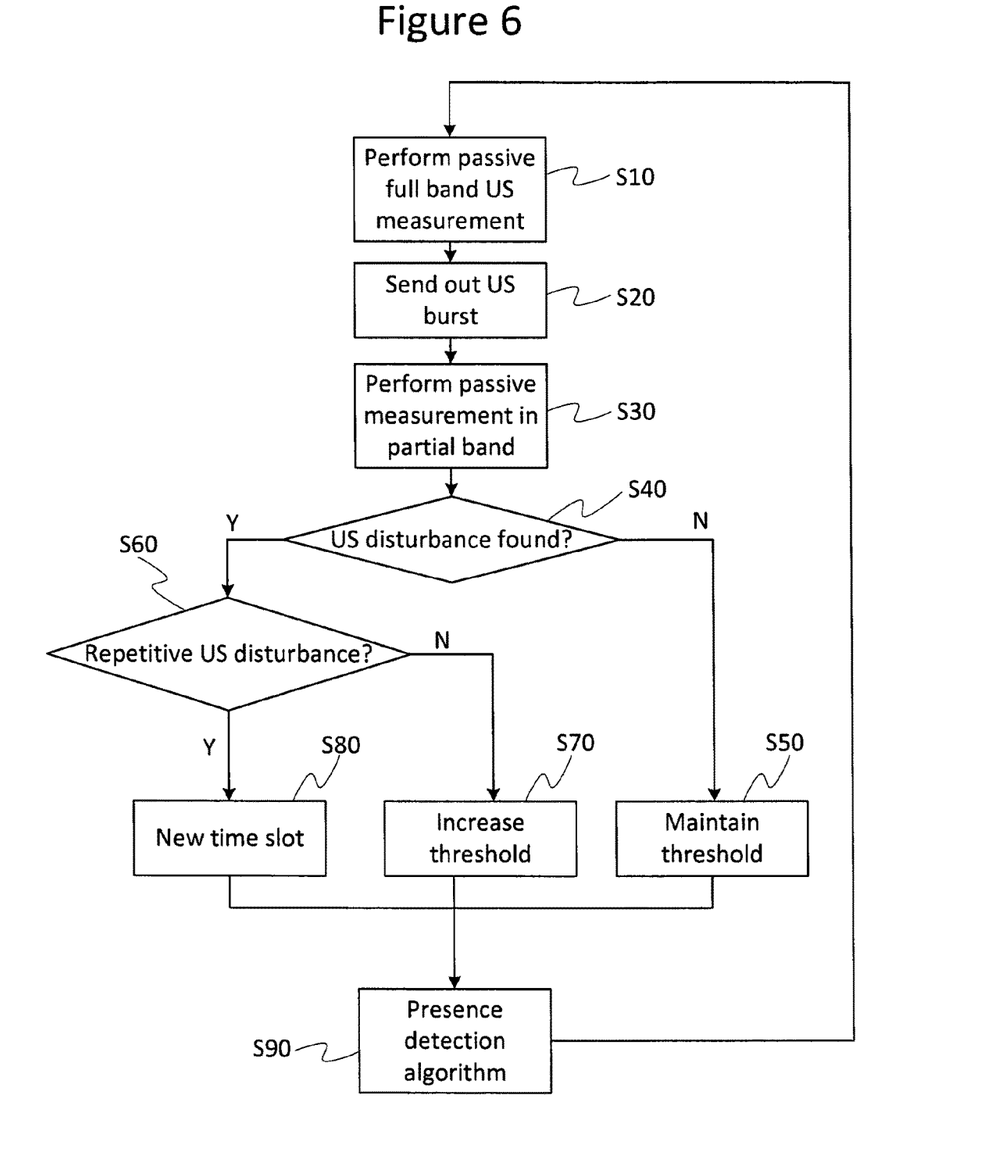
FIG. 6 is a schematic flow chart of a sensing method.

An example of the operations that may be carried out by the control logic 13 is now described in relation to FIG. 6.

At step S10, prior to the next instance of the sensor's currently apportioned time slot $T_1$, the control logic 13 sensor performs a passive scan 24 of the complete spectrum 30. In embodiments the control logic 13 of the sensor 6 has autonomously apportioned the sensor 6 its own time slot, though alternatively the current time slot may have been apportioned as a default at the commissioning stage or by a central controller.

The scan is called "complete" in that it does not exclude a band around the frequency of the wanted active signal and extends substantially beyond that band, preferably extending either side of it. For example, if the ultrasound pulse frequency being used for the active sensing is 40 kHz, the full or wide band scan 24 may extend continuously from 20 kHz to 60 khz.

However, this scan is also performed just before the approaching time slot, preferably ending immediately before it. Hence although this scan is in the same band as the wanted signal, it is not quite at the same time. If any disturbance found just before the beginning of the time slot, it is likely that it will extend into that period.

At step S20, at the start of the next instance of the sensors' time slot, the sensing logic 11 controls the transmitter 20 to send out a burst 26 of ultrasound. It then uses the receiver 22 to perform presence detection by listening for any echoes of that burst occurring for the rest of the time slot—this is the wanted signal.

At step S30, during the measurement period (e.g. current time slot $T_1$) while the sensing logic 11 is performing presence detection (so while step S20 goes on), the control logic 13 will scan for broad spectrum disturbance excluding a small band 32 around the active signal used for presence detection. Hence the scan is only performed in side regions 34 of the spectrum around this band.

Hence although this scan is performed at the same time as listening for the wanted signal, it is performed in a different region of the spectrum, just outside the band of the wanted signal. If any disturbance found just outside this band, it is likely it will also extend into it.

Note that the emitted signal may only have a single nominal frequency, e.g. 40 kHz, but it will be appreciated that in practice the received echoes will have a certain spread in the received spectrum. Further, the form of this spread may in principle be considered to extend indefinitely around the nominal frequency, but in practice the width of the band 32 considered to be associated with the echo is a range within which an effect of the wanted signal is considered to be significant or non-negligible. For example, if the ultrasound pulse frequency being used for the active sensing is 40 kHz, the side-band scan 24 may be performed from 20 kHz to 35 kHz and from 45 kHz to 60 kHz, leaving a 10 kHz band associated with the wanted echo (5 kHz either side of the nominal center frequency).

Also, where it is said that the sensor or one of its components listens or scans for a signal at a certain time or in certain frequencies—whether listening for the wanted signal or a signal due to disturbance note that this does not necessarily imply the transmitter 20 or receiver 22 are physically operated any differently. In embodiments the transmitter 20 may continue to transmit bursts (pulses) at regular intervals (e.g. at the beginning of each instance of the apportioned time slot $T_1$), and the receiver 22 remains "open" to receive signals the entire time (e.g. throughout all time slots), but the sensing logic 11 and/or control logic 13 is configured to listen or not listen by either using or disregarding the signal received by the receiver 22 respectively. For example the decision to use or disregard the signal may be applied in software running on the sensor 6.

At step S40 the control logic 13 determines whether the results of the passive scans are positive or negative.

If the results of the passive scans are negative, then at step S50 the detection threshold applied by the sensing logic 11 is left unchanged. Thus, the current sensitivity of the sensor 6 is maintained. Presence detection then goes on to be performed as usual at step S90, and the method returns to step S10 to be repeated for subsequent instances of the currently apportioned time slot $T_1$.

If on the other hand the result of the passive scans are negative, then at step S70 the control logic 13 controls the sensing logic 11 to increase the presence detection threshold. At step S90 presence detection is then performed based on the increased threshold, and the method returns to step S10 to be repeated for subsequent instances of the time slot $T_1$.

In embodiments, the condition for increasing the detection threshold may be that either of the scans are positive, or that both of the scans are positive.

The increase in the detection threshold will result in a smaller chance of false positives. However, this also means the sensitivity of the sensor 6 to genuine presence events is reduced. To address this, in embodiments of the present invention the control logic 13 is configured to determine whether the detected disturbance is repetitive, i.e. occurs for multiple successive instances of the currently apportioned time slot $T_1$. This is shown at step S60 in FIG. 6.

The criterion for determining repetition may be set at two instances of the time slot $T_1$, or three or more. In embodiments, the condition for detecting repetition may be that either of the scans are repeatedly positive, or that both of the scans are repeatedly positive.

If the results of the passive scans are repeatedly positive, then the method goes to step S80 where the control logic 13 will enter a time slot allocation algorithm to find a new suitable timeslot to perform presence detection measurements. Otherwise the method goes to step S70 where the detection threshold is increased, as discussed above. The method returns to step S10 to be repeated for subsequent instances of the currently apportioned time slot $T_1$.

In embodiments the new timeslot may be selected autonomously by the control logic 13 on the sensor 6 itself, by trying a new time slot different than the current one if it still clashes with another active sensor after the switch, that will soon be determined by the same process and yet another new time slot can be tried, etc., until a free timeslot is found. Alternatively the control logic 13 may switch timeslot by deferring to a central controller.

It will be appreciated the above embodiments have been described only by way of example.

For instance, sensing presence is not limited to sensing motion, nor sensing a human. Generally presence sensing techniques are available for sensing either the motion or the existence of any being (whether human or other living creature), or other animate or inanimate object. Further, the teachings above to not have to be limited to ultrasound sensing, but could be extended to any active sensing technique based on the emission of any signal (e.g. mechanical or electromagnetic radiation) and receiving back echoes of such a signal. Where the sensor is an ultrasound sensor, the receiver 22 may or may not be dedicated to receiving just ultrasound. In embodiments, besides measuring the ultrasonic content, these microphones can also be used for receiving audible sound.

Further, the techniques disclosed herein could be extended to other ways of controlling the light provided into a space, such as a heliostat or window treatment (e.g. automatic blinds); or indeed other functions of a space provided to the being or for the benefit of the being expected in the space, such as air conditioning or heating. Where the function is light, this is not limited to being switched on and off in a yes/no fashion, but the control could also extend to dimming the light in a variable fashion.

According to some embodiments above, it has been described that the control logic 13 may listen for disturbance inside the currently apportioned time slot in region of the spectrum excluding the frequency band of the wanted signal. However, although some accuracy may be sacrificed in distinguishing disturbance from the wanted signal, it is not excluded that the region of the spectrum used to listen for disturbance even inside the same time slot could overlap with the frequency band of the wanted signal.

Where it is said above that a value is within a limit or threshold (or the like), this covers the options of either a "less than" type operation or a "less than or equal" to type operation. Similarly, if it is said that a value is beyond or exceeds a limit or threshold (or the like), this covers the options of either a "more than" or a "more than or equal to" type operation.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A signal processing module for use with a receiver for receiving echoes of an emitted signal, the signal processing module comprising:
   sensing logic for sensing presence of a being or object in a space using echoes of said signal as reflected from the being or object, wherein the echoes are received with an associated frequency band in a spectrum; and
   control logic for detecting disturbance having potential to compromise said sensing, the control logic being configured to detect said disturbance by listening for an unwanted signal in a region of the spectrum outside the frequency band of the echoes, and to adapt the sensing in dependence on the detected disturbance.

2. The signal processing module of claim 1, wherein:
   said signal comprises a series of pulses each emitted in a respective instance of a time slot; and
   the sensing logic is configured to perform said sensing by listening for an echo in each of the instances of the time slot.

3. The signal processing module of claim 2, wherein the control logic is configured to detect disturbance occurring in the time slot by listening for an unwanted signal in a region of the spectrum outside the frequency band of the echoes of the pulses.

4. The signal processing module of claim 3, wherein to detect disturbance occurring in the time slot, the control logic is configured to listen for an unwanted signal in a region of the spectrum excluding the frequency band of the echoes of the pulses.

5. The signal processing module of claim 1, wherein the control logic is configured to detect disturbance by listening for an unwanted signal across a frequency range including the band of the echoes and extending beyond said band.

6. The signal processing module of claim 2, wherein to listen for disturbance across said frequency range, the control logic is configured to listen outside of said time slot.

7. The signal processing module of claim 2, wherein the control logic is configured to detect whether disturbance is found to occur for repeated instances of said time slot.

8. The signal processing module of claim 7, wherein said time slot is an apportioned one of a scheme of time slots, and the control logic is configured to adapt said sensing by switching to another of said time slots in response to detecting disturbance in or around repeated instances of the currently apportioned time slot.

9. The signal processing module of claim 1, for use with an active sensor comprising said receiver and a transmitter for emitting the emitted signal, wherein the sensor is to be used amongst one or more other active sensors each comprising a respective transmitter and receiver; and wherein the disturbance comprises interference from one of the other active sensors.

10. The signal processing module of claim 9, wherein each of the active sensors uses a respective time slot of said scheme to emit a respective signal for performing sensing, and wherein the interference is from one of the other active sensors emitting its respective signal in the same time slot.

11. The signal processing module of claim 1, wherein the control logic is configured to adapt said sensing by adjusting the sensitivity of said sensing in dependence on the detected disturbance.

12. The signal processing module of claim 3, wherein the control logic is configured to detect disturbance by both (i) listening for an unwanted signal across said frequency range but outside said time slot, and (ii) listening for an unwanted signal inside said time slot but outside the frequency band of the echoes.

13. The signal processing module of claim 7, wherein the control module is configured so as: if the sensitivity is decreased in response to the detected disturbance, and if the disturbance is subsequently found to be repetitive, then the time slot is switched and the sensitivity increased.

14. A lighting system comprising:
   the signal processing module according to claim 1,
   the receiver arranged to receive the echoes of the emitted signal;
   a transmitter arranged to emit said signal; and
   one or more lighting devices;
   wherein the control logic is configured to control the one or more lighting devices in dependence on the sensing.

15. Computer program product for sensing presence of a being or object in a space using echoes of an emitted signal as reflected from the being or object, the computer program product comprising code embodied on a non-transitory computer-readable storage medium and being configured so as when executed on a processor to perform operations of:
   performing sensing based on said echoes, the echoes being received with an associated frequency band in a spectrum;
   detecting disturbance having potential to compromise said sensing, by listening for an unwanted signal in a region of the spectrum outside the frequency band of the echoes; and
   adapting the sensing in dependence on the detected disturbance.

* * * * *